Oct. 28, 1958   R. Z. HAGUE ET AL   2,858,461
METER REGISTERS AND DRIVE MECHANISMS THEREFOR
Filed March 14, 1952   2 Sheets-Sheet 1
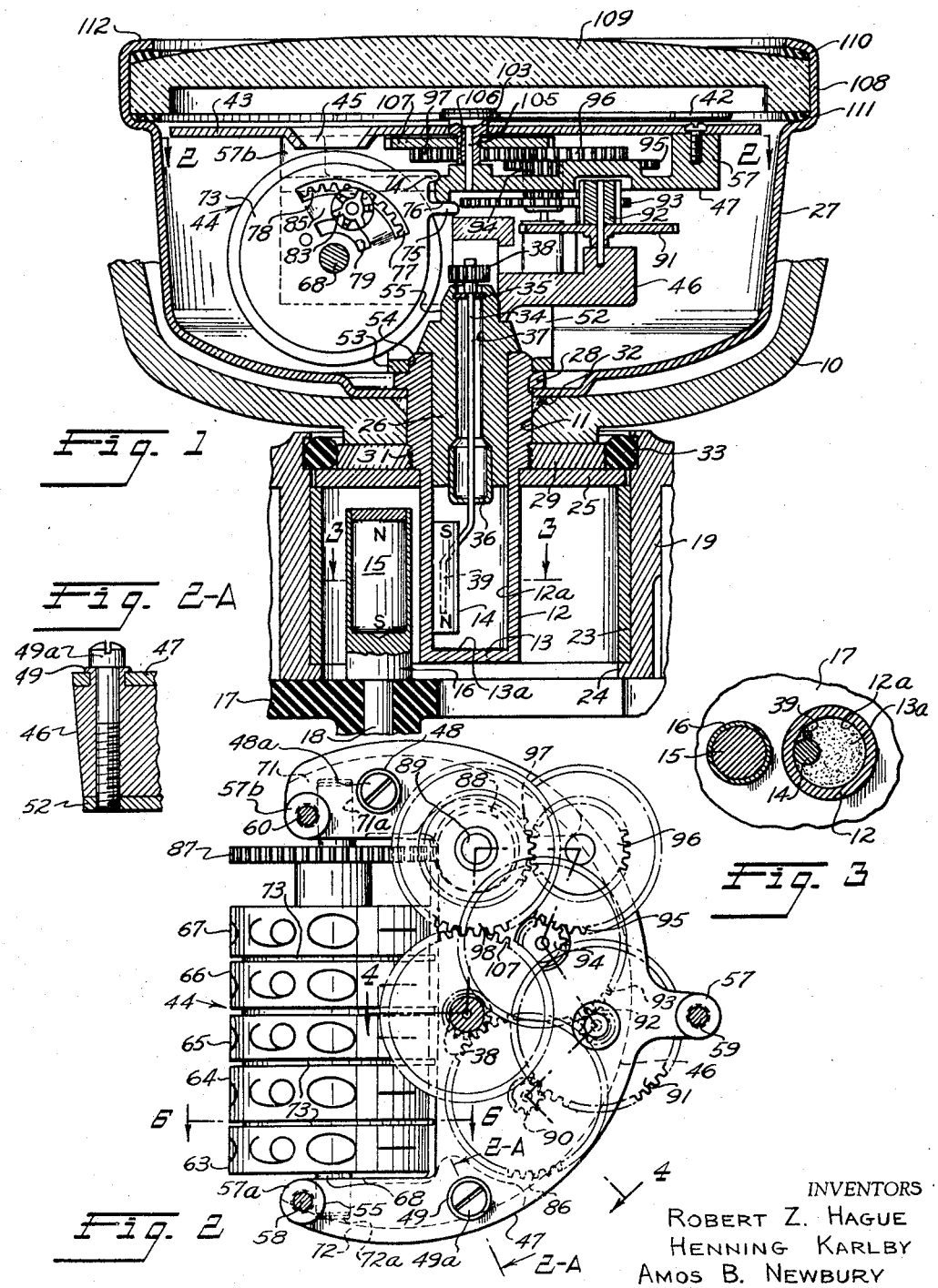
INVENTORS
ROBERT Z. HAGUE
HENNING KARLBY
AMOS B. NEWBURY
BY Strauch, Nolan & Diggins
ATTORNEYS Oct. 28, 1958   R. Z. HAGUE ET AL   2,858,461
METER REGISTERS AND DRIVE MECHANISMS THEREFOR
Filed March 14, 1952   2 Sheets-Sheet 2

INVENTORS
ROBERT Z. HAGUE
HENNING KARLBY
AMOS B. NEWBURY
BY Strauch, Nolan & Diggins
ATTORNEYS United States Patent Office 2,858,461
Patented Oct. 28, 1958

2,858,461

METER REGISTERS AND DRIVE MECHANISMS THEREFOR

Robert Z. Hague, Oradell, N. J., and Henning Karlby, Pittsburgh, and Amos B. Newbury, Murrysville, Pa., assignors to Rockwell Manufacturing Company, Pittsburgh, Pa., a corporation of Pennsylvania Application March 14, 1952, Serial No. 276,652

28 Claims. (Cl. 310—104)

The present invention relates to fluid meters, and in particular to register drive mechanisms and registers therefor. While our invention is of general adaptability, it is particularly useful in connection with sealed drives between the meter and the register, such as shown, for example, in a copending application No. 276,651, entitled Fluid Meters, filed on even date herewith by Robert Z. Hague, Henning Karlby and Ernest H. Treff.

Failure to operate is the most serious complaint that can be made against a meter. Water meters, for example must operate in very adverse surroundings, frequently underground, and the designs of the driving gear trains and register mechanisms have been such as to subject them to corrosive attack of the elements. Such prior mechanisms have therefore been necessarily made of rugged costly corrosion-resistant construction, and the gear trains and register mechanisms have been subject to relatively frequent failure and replacement. It is accordingly a primary object of our present invention to provide a hermetically sealed gear train and register mechanism for water meters and the like in which the mechanisms are not affected by the surrounding atmosphere, and in the construction of which lower cost, less critical materials and lower cost construction may be used than that required in the conventional water meter register.

The most simple drive and hermetically sealed gear train and register mechanism is provided by use of a magnetic drive coupling between the drive and the gear train. Various prior efforts to provide magnetic drives have been made, the best of which is shown in U. S. Patent 2,487,783 to Bergman, issued November 15, 1949. Such drives have, however, been subject to lack of dependability due to the inability of such magnetic drives to reestablish the driving relationship after severance thereof and due to the relatively heavy torque requirements of the gear train and register mechanisms utilized. To provide a novel dependable combination of magnetic drive and low torque registering mechanism is therefore a further object of the present invention. This we accomplish by providing a novel magnetic drive, gear train, and register combination having an available driving torque substantially greater than the resisting torque, and in which the magnetic driving relationship is continuously maintained under practical operating conditions.

While the device disclosed by Bergman is entirely satisfactory for normal operating conditions, such drives are, at times, subjected to abnormal operating conditions which result in malfunctioning of magnetic coupling arrangements such as that disclosed in the Bergman patent. One such extreme operating condition is the subjection of the meter assembly to an extremely strong steady or alternating magnetic field which in the Bergman magnetic drive at times results in failure of the magnetic coupling. In order to avoid this difficulty, magnetic shields have been provided in certain forms of the prior art meters having magnetic drive couplings between the measuring device and register. One of such meters is disclosed in Patent No. 2,566,220, issued August 28, 1951, to A. B. Lindley et al. for Water Meter. The prior art shields with which we are acquainted have not proved to be entirely satisfactory in that they have not been effective against all frequency ranges of alternating magnetic fields to which a meter may be subjected and in that they have been effective only against magnetic fields having a particular orientation relative to the meter structure. It is accordingly an object of this invention to provide an improved magnetic drive embodying a pair of magnetically coupled members guided for conjoint movement about a common axis, and which are readily magnetically shielded preferably against both steady and alternating magnetic disturbances irrespective of the orientation of such disturbances relative to the drive.

More specifically, it is an object of our invention to provide an improved magnetic drive of the type formed by a pair of magnetically coupled members guided for conjoint movement about a common axis, the operation of which is not disturbed by external magnetic fields due to the provision of a first magnetic shield defining a low reluctance magnetic flux path for steady or low frequency magnetic fields and preferably a second shield for preventing interference by high frequency magnetic fields, both of such shields being disposed about the paths of movement of the members.

A second abnormal operating condition to which a magnetic meter drive may be subjected is the high acceleration of fluid flow through the measuring chamber. This requires a corresponding acceleration of the moving parts of the registering mechanism and results, at times, in separation of the driving and driven magnets.

In a magnetic drive of the type disclosed in said Bergman patent, sufficient friction and inertia exist in the register and driving parts so that once the driving and driven magnets become separated the driving magnet will only pick up the driven magnet at extremely low rates of relative velocity at the time the driving magnet comes adjacent the driven magnet. The cause of this difficulty will be best understood by visualizing a theoretic drive arrangement in which a vertical shaft journalled for rotation upon frictionless bearings, upon which a bar magnet is fixed as a crank, is driven by a magnet mounted for movement in a circular path about the axis thereof. In such a theoretic drive system, as the driving magnet approaches the driven magnet, the magnetic force of attraction between the two magnets will impart an impulse tending to cause the driven magnet to move about its shaft in a direction opposite to the direction of movement of the driving magnet. After the driving magnet passes the driven magnet, an opposite impulse is imparted to the driven magnet. Since the two impulses are equal and opposite the driven magnet will not follow the driving magnet. Therefore, when the driving and driven magnets have been separated and the driven magnet has come to rest, movement of the driving magnet merely produces oscillation of the driven magnet. The drive coupling, therefore, cannot be re-established unless the driving magnet is brought substantially to rest in position to pick up the driven magnet, and the drive is gradually accelerated. For these reasons such a theoretic magnetic drive is impractical in a meter mechanism.

In the drive of said Bergman Patent 2,487,783, the best of the prior magnetic meter drives, friction on the driven magnet was minimized to the point that after rupture of the driving connection, the effects of the impulses tending to impart movement to the driven magnet in a direction opposite to that of the driving magnet were not adequately suppressed. In our improved drive, the friction and inertia in the drive between the measuring device and the registering device, and in the register mechanism are such that re-establishment of the drive coupling between the driven magnet and the driving magnet will be effected at substantially greater than normal operating rates of passing velocity.

It is, therefore, an important object of this invention to provide an improved magnetic drive in which the drive connection is maintained at all practical operating conditions.

It is a more specific object of this invention to provide an improved magnetic drive in which inertia effects are minimized and frictional effects are used to suppress the effects of negative impulses in a way to establish and maintain reliability of drive in operation. This we accomplish in the preferred form of our invention by providing driven parts of minimum size and weight to minimize driving friction and inertia, and a magnetic coupling comprising a pair of magnetically attracted members, one of the members being mounted for movement in a first continuous path and the other of said members being guided for movement in a second and similar path within the path of said one member by a means permitting limited free axial movement thereof so that, if the members are separated for any reason during operation, the driven member automatically moves into engagement with a braking surface, whereby movement of the driven magnet toward the driving magnet, as the latter approaches the former, is suppressed.

A further disadvantage of the prior meter drive and register assemblies has been the necessity of reliance upon expensive housing structures to secure proper mounting and alignment of the drive, gear train and register subassemblies. This disadvantage we overcome by piloting the driving spindle and pinion subassembly into the gear train independently of the containing casing structure with resultant substantial improvement in functioning at substantially lowered cost. Another object of our invention accordingly is to provide such a novel piloted combination of drive, gear train and register mechanism in which the need for exact alignment of housing structures is eliminated.

We have found that in a hermetically sealed register driving train and register assembly, the output torque required to drive a satisfactory counter and indicating mechanism is relatively small. Also that a large part of the resisting torque is developed in the driving spindle and pinion subassembly, and that the torque resistance imposed on the drive by the successive gear clusters decreases rapidly. We have accordingly found that by providing, in a hermetically sealed assembly, a driving spindle and pinion subassembly having minimum torque resistance, the torque resistance of the remaining gear clusters, within practical limits, becomes of secondary importance, enabling the production of novel low cost, low torque, reliable drive gear train, and register assemblies. The production of such assemblies is accordingly a further primary object of our invention.

It is still another object of the invention to provide a register of such construction that the shafts journalling the elements of the gear train, particularly the high speed portion thereof, have their bearings in only one of the spaced rigid elements forming the frame, whereby it is not necessary to obtain absolute accuracy of alignment of spaced bearings in separate frame elements thus reducing the cost and increasing the reliability of the mechanism.

A further object is the provision of a novel dial and sweep hand indicator wherein the sweep hand and the pinion driving it are removable as a unit together with the dial thereby facilitating the assembly of the instrument and reducing its cost.

Other objects will become apparent as the description proceeds in connection with the accompanying drawings and from the scope of the appended claims.

Figure 1 is an enlarged vertical sectional view of a preferred embodiment of our improved gear train and register assembly and associated magnetic drive;

Figure 2 is a partial horizontal sectional view taken substantially along the line 2—2 of Figure 1;

Figure 2A is a fragmentary sectional view taken along the line 2A—2A of Figure 2;

Figure 3 is a horizontal sectional view of the magnetic drive, taken along the line 3—3 of Figure 1;

Magnetic drive mechanism

Figure 4:
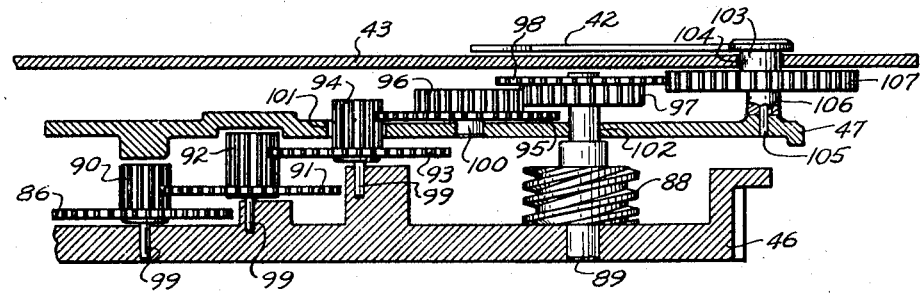
Figure 4 is an irregular vertical section taken along the line 4—4 of Figure 2, showing the interaction of the members of the gear train of the register assembly.

Referring to Figure 1 of the drawings, 10 indicates a portion of a cup shaped wall of the meter housing, dividing the meter mechanism from the register mechanism, as shown in greater detail in said copending application. Centrally of the bottom thereof, the wall 10 has an opening 11 through which passes a tubular member 12 formed of non-magnetic material and having an integral bottom end wall 13. The inner cylindrical wall 12a of member 12 forms a raceway for the relatively small driven magnetic roller member 14 of the magnetic drive for the register. A driving member 15, formed of magnetic material and contained in a non-magnetic housing 16, moves in a circular path about the axis of the tubular member 12. In the disclosed embodiment of our invention, housing 16 and member 15 are moved in such path by an oscillating piston member 17, to which the housing 16 is centrally secured by a pin 18. At least one, and preferably both of the driving and driven magnetic members 15 and 14 are permanent magnets, member 14 being cylindrical so as to roll around the inner wall of tubular member 12. In practice a permanent magnet .125 inch in diameter and .500 inch long gives excellent results with the mechanism shown and described. When members 14 and 15 are both permanent magnets their upper ends are of opposite polarity, as are their lower ends, as indicated in Figure 1.

Magnetic register drive

Driven member 14 is normally held in contact with cylindrical side wall 12a above the internal surface 13a of end wall 13 by the magnetic attraction to driving member 15. Under the influence of the magnetic attraction between members 14 and 15, driven member 14 is caused to roll in a path along cylindrical surface 12a in radial and axial alignment with the driving member as driving member 15 moves in its circular path.

Since there is no axial restraint upon the driven member 14, if for any reason the driving and driven members should become separated, that is if members 14 and 15 become radially misaligned, the weight of the driven member 14 will overcome the supporting force of magnetic attraction to driving member 15 and will, therefore shift axially downward under the influence of gravity into engagement with surface 13a. Surface 13a is roughened to form a friction brake surface. Frictional engagement of the lower end of driven member 14 with the braking surface 13a is sufficient to prevent movement of the driven member toward the driving member as the driving member approaches the driven member. The driven member will therefore remain at rest upon braking surface 13a until the driving member comes to a position adjacent the driven magnet or, considered in another way, until radial alignment of members 14 and 15 is re-established. At that time, the driven member 14 will be lifted axially from surface 13a to the position shown in Figure 1 and the drive will be re-established. This suppression of the effect of the negative impulse or movement of the driven member toward the driving member as the driving member approaches the driven member not only permits pick up of the driven member at much higher passing velocities, but in effect prevents separation in practical operation.

A cylindrical guide ring 19, which forms a part of the meter mechanism, is concentric with and surrounds member 12 providing therewith an annular space for the passage of the driving magnetic member 15. In order to prevent the disabling of magnetic attraction between magnetic members 14 and 15 by a strong low frequency alternating or by a steady magnetic field adjacent the meter, a shield of magnetic material of high permeability is provided around paths of movement of members 14 and 15. The shield takes the form of a cylindrical member 23 seated within guide ring 19 and abutting an internal shoulder 24 thereon; loosely fitting annular plate 25 resting upon the top of member 23, and an insert 26 within tubular member 12. Member 23, plate 25 and an insert 26 are all formed of magnetic material of high permeability, to provide a low reluctance flux path for any externally applied magnetic field and thus prevent disturbance of the magnetic attraction between members 14 and 15. As is disclosed in the said copending application, the meter housing, of which wall 10 is a part, is preferably formed of electrically conductive material, such as bronze, and envelopes the magnetic drive couplings so that it forms a shield to prevent interference from such alternating magnetic fields as would not be sufficiently diverted from the paths of movement of members 14 and 15 by the magnetic shield formed by members 23, 25 and 26.

The register mechanism is enclosed within a generally cup shaped casing 27 of corrosion resistant material, having a central bottom opening beneath an external flange 28 which is adjacent the top of and integral with tubular member 12. Flange 28 and casing 27 are joined in fluid tight relationship by a suitable means such as welding.

The casing 27 rests on top of the cup shaped wall 10 at its opening 11. An annular sealing element 32 is in a recess or countersink in wall 10 adjoining its central opening 11. Casing 27, wall 10, sealing element 32, and tubular member 12 are held in rigid relationship by means of an internally threaded ring 29 which is threaded on to tubular member 12 at 31 compressing sealing element 32 and forming a fixed fluid seal preventing passage of fluid past the opening 11. An annular space between ring 29 and an inner peripheral groove adjacent the top of guide ring 19 receives a resilient O ring 33. In the final meter assembly the O ring 33, the ring 29 and the groove in guide ring 19 provide piloting surfaces for maintaining accurate alignment of the tubular member 12 relative to the guide ring 19 of the meter.

It should be noted that the method of mounting the register gear train and piloting it at 55 is purposely made independent of casing 27. It should also be noted that the alignment between tubular member 12 and ring 19 is obtained via ring 29 and O ring 33 and does not depend in any way on wall 10 or the rest of the meter housing. Further alignment required in the mechanism is obtained step by step as you progress up the mechanism. At no time is the alignment between wall 10 and casing 27 functional.

A lightweight register drive spindle 34 preferably of wire and of minimum diameter (in practice of the order of .020 inch) is journalled for rotation in a pair of spaced bearing members 35 and 36 that are mounted in a central bore 37 in the insert 26. Member 36, which is formed of non-magnetic material, projects downwardly below the lower end of insert 26 and is of sufficiently large diameter relative to that of the member 14 and the inner cylindrical wall 12a to assure the maintenance of the member 14 in spaced relation from the end of insert 26 to prevent the establishment of an effective magnetic attraction therebetween if the register assembly is inverted as in shipment or storage. Primary or high speed drive pinion 38 is fixedly secured to the top of spindle 34 by means of a hub the lower face of which abuts the upper surface of upper member 35 and supports the drive spindle 34 against downward movement. Spindle 34 at its lower end is bent outwardly and then vertically to form a crank-like portion 39 that lies in the path of rotation of the driven magnetic member 14. As the driven member 14 rolls over the inner surface 12a of tubular member 12, it will drivingly engage the crank-like portion 39 of the register drive spindle 34, as best shown in Figures 1 and 3. As will more fully hereinafter appear, because of the extremely low inertia and friction and the low torque requirements of the gear train and register mechanism there is no chance of the magnetic driving member 15 going past the driven magnetic member 14 without picking it up and rotating the crank 39 and the register drive spindle 34. It should be noted that as shown, the driven magnetic member 14 is completely free of axial restraint by crank 39.

Since there is no restraint upon the driven member 14 by the crank portion 39 of the register drive spindle 34, the inertia of the register drive train can have no effect upon the driven member 14 if the driving member 15 is suddenly brought to rest by suddenly shutting off the fluid passing through the meter. Thus the only inertia tending to separate the driving and driven members is that of the small driven member itself.

*Register mechanism and driving gear train*

The total quantity of fluid that has passed through the meter is indicated by a pointer 42 (Figure 5) pivotally mounted centrally of an indicator dial 43, and a plural order counter mechanism 44, a peripheral portion of which is visible through a window 45 formed through the indicator dial 43. The register and driving gear train assembly is a compact unit formed of lightweight instrument type parts having low friction and inertia, and is hermetically sealed so that the corrosive atmosphere and elements to which meters of this type are normally subjected will not affect the accuracy and dependability of the unit. This assembly is best shown in Figures 2, 4 and 5.

Counter mechanism 44 and the various gears of the drive train from the register drive spindle 34 are supported upon a pair of lower and upper die-cast frame members 46 and 47 (Figures 2 and 5), each having the general shape of a yoke, as shown in Figure 2, and swaged together at 48 and 49 in the manner best shown in Figure 2A. A bracket 52 (Figure 5) having a central depressed portion 53, is secured to the bottom of frame member 46 as shown in Figures 2A and 5, the bottom ends of a pair of screws 48a and 49a, which extend through bores formed through member 46 coaxial with the swaged portions 48 and 49, being threaded into its outer end portions. An aperture 54 (Figure 5) is formed centrally through the depressed portion 53 of bracket 52, which, as shown in Figure 1, in assembly, surrounds and is fixedly attached to the upper portion of tubular member 12 above its flange 28. The gear train assembly is thus supported by bracket 52 upon flange 28 of tubular member 12. Insert 26, upon which spindle 34 is journalled, is freely but not loosely received within the upper end of member 12 and is formed at its upper end with an external cylindrical portion 55 which mates with an internal segmental cylindrical surface 56 to accurately position the drive pinion 38 in properly aligned axial relation to the gear train assembly and in proper mesh with high speed gear 86.

Figure 5:
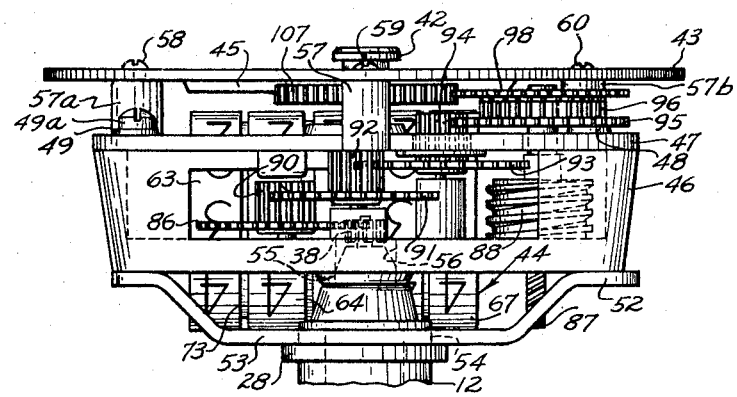
Figure 5 is an end view of the register assembly of Figure 2, as viewed from the right thereof.

Indicator dial plate 43, as is best shown in Figures 1 and 5, is supported in parallel spaced relation with the top surface of upper frame member 47, by three spaced bosses 57, 57a and 57b which are conveniently formed integral with upper member 47, plate 43 being secured to these bosses by screws 58, 59 and 60 (Figure 2) which are respectively threadedly engaged therewith.

The counter mechanism 44 is of generally conventional design, being generally of the intermediate pinion carry mechanism type similar to that disclosed in U. S. Patent No. 1,909,740, issued May 16, 1933, to Zubaty. This mechanism comprises a series of counter wheels 63–67 inclusive, the last four of which are journalled upon a shaft 68 (Figure 6), and the first of which is fixed thereon. These wheels represent, respectively, the units, tens, hundreds, thousands and ten thousands orders of the counter mechanism 44. Shaft 68 is journalled for rotation between the arms 71 and 72 (Figure 2) of the yoke shaped member 46, its opposite ends being received in recesses 71a and 72a respectively.

Figure 6:
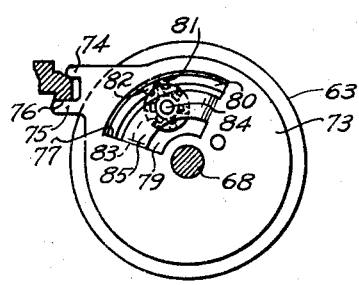
Figure 6 is a vertical section through the counter assembly, taken along the line 6—6 of Figure 2.

A carry pinion support plate 73, as shown in Figures 1, 2 and 6, is mounted intermediate each adjacent pair of counter wheels and each plate 73 is provided with a pair of ears 74 and 75 (Figure 6) which embrace a ledge 76 formed integrally with the upper die cast frame member 47, and extending parallel to the axis of shaft 68. The engagement of ears 74 and 75 with ledge 76 prevents rotative movement of the support plates 73 about the shaft 68. The face of each counter wheel which is adjacent the next lower order counter wheel is provided with a recess 77 (Figure 1) around the peripheral edge of which is formed a continuous row of internal annular teeth 78 coaxial with shaft 68. As is shown in Figure 6, each counter wheel face adjacent the next higher order is provided with a recess 79 on the peripheral edge of which is formed a pair of adjacent gear teeth 81 and 82 and a peripheral ledge 80 coaxial with shaft 68 and which is axially shorter than the length of gear teeth 81 and 82. A carry pinion 83 is journalled upon stub shaft 84 which is fixed to an offset portion 85 (Figure 1) of the support plate 73. The teeth of pinion 83 are in constant mesh with the row of teeth 78 on the counter wheel of the next higher order and are of such formation that they coact with the pair of teeth 81 and 82 and the ledge 80 of the next lower order counter wheel in the manner of a Geneva movement.

In the particular embodiment disclosed, a complete revolution of a lower order counter wheel will advance the pinion 83 two teeth which, in turn, will advance the associated counter wheel by one unit or a tenth of a revolution by the advancement of the internal annular gear teeth 78 by two teeth. The teeth of pinion 83 coact with the ledge 80 to prevent movement of the pinion 83 of the adjacent higher order counter wheel except at the time when the teeth 81 and 82 engage the teeth of the pinion 83. The count of the counter mechanism 44 is advanced by rotation of shaft 68 to which the lowest order counter wheel 63 is fixed. Thus 10,000 revolutions of the shaft 68 will produce 10,000 revolutions of the counter wheel 63, 1000 revolutions of the counter wheel 64, 100 revolutions of wheel 65, 10 revolutions of wheel 66 and one revolution of wheel 67. Reference may be made to the aforesaid Zubaty Patent 1,909,740 for a more detailed explanation of the mode of operation of counter mechanisms of this type, if necessary.

Counter mechanism 44 is driven from spindle 34 by a gear train of small lightweight gears having low inertia and which requires a minimum of driving torque. Pinion 38 (Figures 1 and 5), fixed to the upper end of drive spindle 34, meshes with gear 86 (Figures 4 and 5). Input shaft 68 of counter mechanism 44 is driven by a worm wheel 87 (Figure 5) fixed thereto. Worm wheel 87 meshes with worm 88 which is fixed to and driven by shaft 89, supported by and journalled at its lower end in frame member 46 and its upper end in frame member 47 (Figure 4). Shaft 89 is driven from gear 86, with which pinion 38 on spindle 34 is in mesh, by a reduction gear train consisting of pinion 90 fixed to and rotatable with gear 86, gear 91 in mesh with pinion 90, a pinion 92 fixed to gear 91, gear 93 in mesh with pinion 92, pinion 94 fixed to gear 93, gear 95 in mesh with pinion 94, and pinion 96 fixed to gear 95 in mesh with gear 97. Gear 97 is fixed to gear 98 and both are fixed on the upper end of shaft 89. Thus, upon rotation of the spindle 34, the counter mechanism 44 is advanced through the action of this drive train.

The gear and pinion pairs 86—90, 91—92, and 93—94 are interchangeable and are journalled for rotation on parallel steel shafts 99 fixed in frame member 46. Pinions 90, 92 and 94 are preferably formed of bronze and provided with bores having bearing fits on shafts 99. Gears 86, 91 and 92 are staked on shoulders formed on pinions 90, 92 and 94 respectively and preferably formed of brass. The use of dissimilar metals in mating gears and pinions results in lowered frictional resistance and longer life of the gearing. By way of example of the light weight parts used, in the embodiment shown the diameter (within close tolerances) of shafts 99 is .046 of an inch, and grears 86, 91 and 93 each have 54 teeth, are .683 of an inch in outside diameter and are stamped from #24 (.0201) B&S brass, while pinions 90, 92 and 94 have 12 teeth and an outside diameter of .192 of an inch and are wide enough to provide for interchangeable use in the intermediate reduction stages.

Gear and pinion pair 95—96 is journalled on pin 100 pressed into and extending upward from upper frame member 47. Pinion 94 extends upwardly through an aperture 101 in member 47 to mesh with gear 95, and shaft 89 extends upward through a bearing surface 102 in member 47 to support the gear pair 97—98. Gears 95 and 98 are of brass and are interchangeable. Gears 96 and 97 are like gears of different tooth numbers with gears 95 and 98 staked thereto and are formed of bronze with bores of the same size, so that gear pairs 95—96 and 97—98 may be interchanged. The gears 96 and 97 are made with different tooth numbers so that, when the gear pairs 95—96 and 97—98 are interchanged the ratio of the gear train is changed from that suitable for gallon registration to that suitable for cubic foot registration.

As best shown in Figure 4, indicating pointer 42 is fixed to a hollow hub 103 extending through an aperture 104 formed in the indicator dial 43. Hub 103 is also journalled on a fixed shaft 105 of the same size as shafts 99, fixed in a boss 106 on the upper frame member 47. Below dial 43 a gear 107 is fixed on a lower portion of hub 103 which is of reduced diameter and knurled. By this construction the dial 43, the pointer 42, hub 103 and gear 107 are removable as a subassembly after removal of the screws 58, 59 and 60 (Figure 2). As is shown in Figure 4, gear 107 is in mesh with gear 98 fixed to and rotatable with gear 97 and shaft 89, so that indicating pointer 42 is rotated about the shaft 105 in timed relation with the drive of the counter mechanism 44.

As will be apparent from the foregoing description, and as shown in Figure 4, all of the gears except 97 and 98 are journalled on fixed shafts in the die cast members 46 and 47 and may be readily dropped into place during assembly, providing economy of manufacture and ease of assembly.

It will accordingly be seen that a convenient, simplified low cost reducing gear train and register assembly having low frictional and torque resistance, without the need of lubrication has been provided which is highly important in the provision of a reliable magnetically driven meter. Due to the lightweight and low torque resistance of the parts in the example given, even with the small magnets used, the torque resistance of the register mechanism is approximately one tenth or less of the magnetic driving torque available.

As best shown in Figure 1, the register assembly is sealed in a cup shaped casing 27 of corrosion resistant material having a radially enlarged portion 108 in which a transparent window 109 is mounted. Window 109 is held in sealed relation to the enlarged portion 108 of the casing 27 between a pair of annular gaskets 110 and 111, and the top peripheral edge 112 of casing 27 is spun over the gasket 110 to complete the assembly of the register and to form a permanently sealed unit into which neither dirt nor moisture can enter, and which cannot be disassembled without destruction of the casing 27. To absorb any initial moisture that may be trapped in the assembly during manufacture a small quantity of hygroscopic material may be sealed into the cup. Thus tampering with the register by unauthorized persons is prevented and long life and reliable performance of the mechanism is assured.

Summary

In summary, we would like to emphasize the advantages of certain of the disclosed features of our present invention. The magnetic drive herein disclosed constitutes an improvement over prior art drives such as that disclosed in the aforesaid Bergman patent in that pick up of the driven member by the driving member at normal rates of driving member velocity is made possible by the provision of a friction brake surface. This prevents movement of the driven member along its circular path while radially misaligned relative to the driving member by suppressing the effect of the negative impulses on the driven magnet in a manner not possible in the Bergman drive due to the antifriction surface upon which the driven member rested while radially misaligned. The present magnetic drive constitutes an improvement over such prior art drives in that the driven member is free of restraint by the register drive spindle.

The present invention provides a register mechanism of improved and simplified construction which greatly reduces the cost of manufacture and assembly and which results in greater reliability of operation. The insert 26, spindle 34, pinion 38 and bearings 35 and 36 constitute a compact subassembly which in final assembly is accurately aligned relative to the register mechanism drive train by the coaction of mating piloting surfaces 55 and 56 thus eliminating the necessity of accurate alignment of both the drive spindle and the register drive train relative to the casing structure as in prior art arrangements. The gears of the drive train are mounted upon cantilever supported shafts fixed to one or the other of the support structure frames. This greatly reduces the cost of assembly of the parts of the drive train. The indicator subassembly including gear 107, plate 43, and indicator arm 42 is a compact unit which can be easily and quickly mounted in proper alignment with the register drive train.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a pair of magnetically attracted members guided for movement in substantially concentric circular paths about a generally upright axis, means for moving one of said members along its path whereby the other of said members will normally move along its path substantially in radial alignment with said one member under the influence of the magnetic attraction therebetween, and means for preventing movement of said other member except in a predetermined direction along its path so long as it is substantially radially misaligned relative to said one member.

2. The combination defined in claim 1, wherein said other member is free of axial restraint other than the magnetic attraction between said members so that if said members become so radially misaligned, said other member will shift axially downward under the influence of gravity, and wherein said last-named means is a friction brake surface engaged by the said other member so long as it is so axially shifted downward.

3. A magnetic drive comprising, in combination, a first member, means for moving said first member along a first path, a second member, means for guiding said second member for movement in a second and similar path spaced from said first path, at least one of said members being a permanent magnet and the other being of such material as to be attracted thereto, and means for preventing any material movement of said second member along said second path in a direction toward said first member as said first member approaches said second member along said first path under the influence of the magnetic attraction therebetween.

4. A magnetic drive comprising a first member, means for moving said first member along a first continuous path about a vertical axis, a second member, means for radially guiding said second member for movement along a similar continuous path about said axis, the path of said second member being uniformly radially spaced from and normally in substantial alignment along said axis with the path of said first member, one of said members being a magnet and the other being formed of such material as to be attracted thereto so that movement of said first member in its path causes corresponding movement of said second member in its path, said second member being normally free of restraint other than the magnetic attraction between said members, and a support having a surface with a high coefficient of friction disposed below and normally axially spaced from the bottom of said second member, said second member being free to drop into frictional engagement with the surface of said support upon interruption of effective magnetic attraction between said members so that movement of said second member toward said first member under the influence of the magnetic attraction between said members as said second member approaches said first member is prevented.

5. A magnetic drive assembly comprising a tubular well having a cylindrical internal surface and a bottom surface normal to the axis of said cylindrical surface, said bottom surface having a high coefficient of friction a roller member within said well, a second member mounted for movement in a circular path about the axis of said cylindrical surface of said tubular well and above said bottom surface, means for moving said second member in said circular path, one of said members being a permanent magnet and the other being attracted thereto whereby said members are normally magnetically coupled so that movement of said second member in said circular path causes rolling of said roller member in a concentric path on said cylindrical surface above said bottom surface in substantially radial alignment therewith, said roller member being free of axial restraint other than the magnetic attraction between said members so that said roller member is free to drop into frictional engagement with said bottom surface if said members become so radially misaligned as to overcome the effectiveness of the magnetic coupling force therebetween whereby any material movement of said roller member toward said second member due to magnetic attraction between said members as said second member approaches said roller is prevented.

6. A fluid meter register drive mechanism comprising a tubular housing having an open upper end and a closed lower end, a lightweight wire spindle within said housing, a pair of vertically spaced rigidly mounted bearing members journalling and suspending said drive spindle in longitudinally extending relation within said housing, an integral eccentric crank portion formed on said wire spindle within said housing below the lower bearing member, a small diameter output pinion affixed to said spindle above and engaging the upper bearing member of said pair to provide an axial support for and thereby determine the axial position of said spindle, a magnetic drive coupling between said crank and a member driven in response to fluid flow through the meter including a follower operatively engaging said crank, and a lightweight indicator actuating gear train connected to the pinion.

7. The combination defined in claim 6, together with a cup-shaped casing enclosing the gear train and affixed and sealed at the bottom of said casing to said tubular housing, said casing and tubular housing constituting a factory sealed unit containing the magnetic coupling follower and the entire indicator drive from the follower and precluding access thereto except by destruction of said casing and housing.

8. The combination defined in claim 6, together with a cup shaped casing enclosing said gear train; a tubular member having a cylindrical inner wall affixed and sealed to the bottom of said casing and having a closed bottom; means in said tubular member mounting said drive spindle bearing members; said follower being a cylindrical magnetic roller located within said tubular member and movable around the periphery of its inner wall in a driving path for said crank.

9. A register drive unit comprising a casing having a depending tubular projection; an indicator, a support therefor, and a plurality of intermeshed gears rotatably mounted on said support and defining a reduction drive train to said indicator, means mounting said support within said casing; a longitudinally apertured insert mounted within said tubular projection, a spindle journalled for rotation on said insert, a pinion fixed to the upper end of said spindle, coacting piloting means on said insert and said support for accurately aligning said pinion in meshing engagement with a gear of said drive train, and a magnetic coupling follower element freely mounted within said tubular projection for operative drive connection with said spindle.

10. In combination with a casing enclosed register mechanism for a fluid meter which includes a speed reduction gear train; a drive coupling for such register mechanism gear train comprising magnetically attracted driving and driven members disposed respectively externally and internally of the casing of said register mechanism, means responsive to fluid flow through the meter for moving said driving member in a continuous path about a portion of said register mechanism casing, means within said casing for guiding said driven member in a similar substantially concentric path so that said driven member will normally move along its path substantially in radial alignment with said driving member under the influence of the magnetic attraction therebetween in response to movement of said driving member; a spindle mounted for rotation within said casing, drivingly connected to said register mechanism gear train, and having a portion disposed within the path of movement of said driven member, and means in said casing operative so long as said members are substantially radially misaligned due to momentary interruption of the effective drive coupling force between said members to greatly increase the force necessary to move said driven member along its path.

11. The combination defined in claim 10, wherein said driven member is free of axial restraint other than the magnetic attraction between said members so that, when said members become so radially misaligned, said driven member will move axially downward under the influence of gravity, and wherein said last named means is a frictional brake surface engaged by said driven member so long as it is so axially shifted relative to the driving member.

12. In a fluid meter having a magnetic member mounted for movement in a continuous path in response to fluid flow through the meter, a sealed register mechanism and drive subassembly comprising a casing having a hollow fluid tight portion projecting therefrom and into the confines of the continuous path of movement of said magnetic member, a second magnetic member guided for movement within the projecting portion of said casing in a predetermined closed path, a spindle journalled within said hollow casing portion and having a portion disposed in the path of movement of the second said magnetic member, at least one of said magnetic members being a permanent magnet and the other attracted thereto so that the second said member will normally move along its path through a complete cycle in response to movement of the first said magnetic member through a complete cycle and drive said spindle, said second magnetic member being free of axial restraint other than the magnetic attraction between said members, an indicator disposed within said casing, a lightweight low friction gear train drivingly interconnecting said spindle to said indicator within said casing, and means within said projecting portion of the casing for greatly increasing the force necessary to move the second said magnetic member along its path so long as said magnetic members are radially misaligned due to momentary interruption of the effective drive coupling force between said members.

13. In combination in a fluid flow meter having a member driven by flow of fluid through said meter, a register casing having a projecting tubular portion having a closed outer end, a free rolling member disposed within said portion and adapted to roll about an internal surface in said portion, means magnetically coupled to said free rolling member displaced by said flow driven member in a closed path about said surface, a spindle support mounted in the open end of said tubular portion, a spindle journaled on said support with one end drivingly connected to said free rolling member and the other end projecting above said support, a gear on said spindle above the support, a rigid gear carrier mounted within the casing and positioned therein exclusively by a pilot connection between said carrier and said support, a gear train mounted exclusively on said carrier and meshed at one end with said pinion, and an indicator shaft journaled on said carrier and driven by said gear train.

14. In a magnetic drive wherein a free driven element is magnetically coupled to a drive element, a spindle operatively connected to said driven element, a bearing support for said spindle made of magnetic material, and non-magnetic means on the support projecting away from said support and toward said driven element for establishing a minimum possible non-magnetic gap between said driven element and said support thereby preventing undesired magnetic coupling between said driven element and said support which would disturb the operation of the drive.

15. In a fluid meter, a casing having a projecting tubular portion of non-magnetic material that has an internal surface of revolution and a closed outer end, a roller of magnetic material within said portion adapted to roll along said surface in response to an element magnetically coupled thereto and driven in a path about said tubular portion in response to fluid flow through said meter, a rigid spindle support mounted in the open end of said tubular portion, a lightweight drive spindle suspended on and extending through said support and formed at its lower end to be operatively engaged and thereby rotated by the roller as the latter moves along said surface, a gear fixed upon the other end of said spindle where it projects from the support into said casing, said spindle being a length of wire bent at its lower end to provide a crank section for drive contact with said roller, register mechanism within the casing drivingly connected to said gear, a shield of magnetic material surrounding said tubular portion and the path of said element including a transverse shield section extending to said tubular portion, and said support comprising a block of magnetic material that forms part of the magnetic shield as an effective continuation of said transverse section.

16. In a fluid meter, a casing having a projecting tubular portion of non-magnetic material that has an internal surface of revolution and a closed outer end, a roller of magnetic material within said portion adapted to roll along said surface in response to an element magnetically coupled thereto and driven in a path about said tubular portion in response to fluid flow through said meter, a rigid spindle support mounted in the open end of said tubular portion, a lightweight drive spindle suspended on and extending through said support formed at its lower end to be operatively engaged and thereby rotated by the roller as the latter moves along said surface, a gear fixed upon the other end of said spindle where it projects from the support into said casing, and register mechanism within the casing drive connected to said gear, said support being of magnetic material and means on the lower end of said support limiting radial movement of said spindle and preventing magnetic coupling of the roller and the support.

17. A drive coupling comprising a driving member, means for moving said driving member in a closed path, a continuous raceway in substantially uniform spaced relation from the path of movement of said driving member, a driven member disposed on said raceway and magnetically coupled to said driving member so that said driven member will normally move along its path along said raceway in closely spaced relation to said driving member under the influence of the magnetic coupling force therebetween in response to movement of said driving member, and means for preventing any material movement of said driven member along its path in a direction opposite to the direction of driving member movement under the influence of the coupling force between said members in the event such normal drive relation is momentarily interrupted.

18. A drive coupling for a mechanism enclosed within a casing comprising magnetically coupled driving and driven members disposed respectively externally and internally of said casing, means for moving said driving member in a closed path about a portion of said casing, means within said casing for guiding said driven member in a similar path so that said driven member will normally move along its path in the same direction as and in closely spaced relation to said driving member under the influence of the magnetic coupling therebetween in response to movement of said driving member, and means for preventing any material movement of said driven member along its path in a direction opposite to the direction of driving member movement under the influence of the coupling force between said members in the event such normal drive relation is momentarily interrupted.

19. In the combination set forth in claim 18, the paths of movement of said members being substantially horizontal and said driven member being free of restraint transverse to its path other than the magnetic attraction between said members and said means preventing movement of said driven member comprising a surface having a high coefficient of friction disposed below the path of driven member movement so that upon interruption of the normal drive relation between said members, said driven member will drop into contact with said friction surface under the influence of gravity.

20. A magnetic coupling embodying magnetically coupled driving and driven members movable in closely spaced closed paths and means for moving the driving member through its path so that the driven member normally will be moved in the same direction through its path under the influence of the magnetic coupling force between said members, and means operative in the event of momentary interruption of the effectiveness of the drive coupling force between said members for preventing any material reverse movement of said driven member through its path.

21. The coupling defined in claim 20 wherein said driven member is continuously subject to a force biasing it in a direction transverse to its path and wherein said movement-preventing means comprises a brake engageable by said driven member under the influence of said biasing force in the event of interruption of the drive coupling force effectiveness.

22. In a fluid meter, a casing having a projecting portion of non-magnetic material that has an internal surface of revolution forming a raceway and a closed outer end, a free rolling member of magnetic material within said portion adapted to roll along said surface in response to movement of an element magnetically coupled thereto and driven in a path about said portion in response to fluid flow through said meter, a rigid spindle support mounted in the open end of said portion, a lightweight drive spindle rotatable coaxial with said surface and suspended on and extending through said support and having at its lower end an eccentric portion disposed adjacent said surface to be operatively abuttingly engaged and thereby rotated by said free rolling member as the latter moves along said surface, a gear fixed upon the other end of said spindle where it projects from the support into said casing, and a register mechanism within the casing drive connected to said gear, the eccentric portion of said spindle providing a crank section disposed in the path of said free rolling member to be pushed thereby while remaining free to coast ahead of said free rolling member over a substantial portion of its path of movement without engaging said free rolling member whereby movement of said spindle through said substantial portion of the path of said spindle due to its inertia and that of the parts driven thereby will not interrupt the effective drive coupling force between said element and said free rolling member.

23. A register mechanism magnetic drive coupling comprising a drive member mounted for movement in a predetermined closed path, a continuous raceway disposed in substantially uniform spaced relation to said drive member movement path, a freely rolling driven member disposed on said raceway and maintained in spaced relation to said driven member by said raceway, said driven member being normally magnetically coupled to said drive member for movement along said raceway under the influence of the magnetic coupling force between said members as said drive member moves along its path, said drive coupling being subject in normal operation to certain conditions in which the forces momentarily acting upon the drive member other than said magnetic coupling force may be effective to disestablish the drive coupling between said members for a single cycle of movement of said drive member about its path, and means automatically operative in the event of the occurrence of such a condition for preventing any material movement of said driven member toward said drive member in the direction opposite to the direction of movement of said drive member as said drive member approaches said driven member toward the end of such a single cycle.

24. A magnetic drive comprising a spindle, a driving member, means for moving said driving member along a first path, a driven member for driving said spindle, means for guiding said driven member for movement in a second and similar path spaced from said first path, at least one of said members being a permanent magnet and the other being of such material as to be attracted thereto, and means providing a driving connection between said driven member and said spindle as long as said driving member is being driven by said moving means but releasing said spindle when said driving member is no longer so driven so that said spindle is free to coast due to inertia without affecting the drive coupling between said members, said last named means comprising a crank on said spindle disposed in the path of movement of said driven member to be operatively abuttingly engaged and thereby rotated by said driven member and movable ahead of said driven member under the influence of inertia throughout a major portion of its path of movement without engagement with said driven member upon deceleration of said driven member.

25. In a fluid meter, a casing having a projecting hollow portion of non-magnetic material and having a closed outer end, an elongated magnetic member within said hollow portion and movable therein for revolution in a generally circular path normal to its axis in response to movement of an element magnetically coupled thereto and driven in a path about said casing portion in response to fluid flow through said meter, a rigid spindle support mounted in the open end of said casing portion, a drive spindle rotatably mounted on said spindle support and drive connected to said magnetic member, a register, means drive connecting said spindle to said register, a shield of magnetic material surrounding said casing portion and the path of said element, including a transverse shield section extending to said casing portion, and said support comprising a body of magnetic material that forms part of the magnetic shield as an effective continuation of said transverse section.

26. In a fluid meter, a casing having a projecting hollow portion of non-magnetic material and having a closed outer end, means in said casing hollow portion defining a generally circular raceway, a free rolling member of magnetic material within said casing portion and movable therein along said raceway in a generally circular path in response to movement of an element magnetically coupled thereto and driven in a path about said casing portion in response to fluid flow through said meter, a rigid spindle support mounted in the open end of said casing portion, a lightweight drive spindle rotatably mounted on said spindle support and having a portion disposed in the path of movement of said free rolling member to be driven thereby, a register, means drive connecting said spindle to said register, a shield of magnetic material surrounding said casing portion and the path of said element including a transverse shield section extending to said tubular portion, and said support comprising a block of magnetic material that forms part of the magnetic shield as an effective continuation of said transverse section.

27. In a fluid meter, a register mechanism and a fluid flow responsive drive for said mechanism, said drive comprising a pair of magnetically coupled bar members of magnetic material mounted for revolution in concentric inner and outer circular paths normal to their axes, a tubular fluid-tight non-magnetic sealing member interposed between the paths of movement of said members, said tubular sealing member having one end wall forming a fluid-tight seal at one axial end of the path of movement of the inner of said bar members, a bearing support in said tubular sealing member forming the opposite end wall of said tubular sealing member at the other axial end of the path of movement of said inner bar member, a spindle journalled in said bearing support drive connecting said inner bar member to said register mechanism, and a shield of magnetic material surrounding said tubular sealing member and the path of movement of the other of said bar members and including a transverse section extending to said tubular sealing member at the region of one of its said end walls, said end wall to the region of which said transverse section extends being formed of magnetic material and forming an extension of said shield.

28. In a register drive unit, a sealed casing defining a gear chamber and having a closed end tubular projection extending therefrom, a gear support, a plurality of intermeshed gears rotatably mounted on said support and defining an indicator reduction drive train, means mounting said support within said casing; a longitudinally apertured insert mounted within said tubular projection, a spindle mounted for rotation on said insert and having one end extending beyond said projection into said gear chamber, a pinion fixed to said spindle one end, coacting piloting means in said insert and said support for accurately aligning said pinion in meshing engagement with a gear of said drive train, and a magnetic coupling driven element disposed within said tubular projection in operative drive relation with the other end of said spindle.

References Cited in the file of this patent

UNITED STATES PATENTS

| | | |
|---|---|---|
| 280,322 | Nash | June 26, 1883 |
| 593,612 | Scribner | Nov. 16, 1897 |
| 1,563,769 | Marden | Dec. 1, 1925 |
| 1,870,155 | Weymouth | Aug. 2, 1932 |
| 2,213,799 | Bassett | Sept. 3, 1940 |
| 2,366,562 | Schug | Jan. 2, 1945 |
| 2,399,856 | Coger | May 7, 1946 |
| 2,487,783 | Bergman | Nov. 15, 1949 |
| 2,556,854 | Spears et al. | June 12, 1951 |
| 2,566,220 | Lindley | Aug. 28, 1951 |
| 2,577,282 | Sliwinski | Dec. 4, 1951 |

FOREIGN PATENTS

| | | |
|---|---|---|
| 625,135 | France | Apr. 19, 1927 |